United States Patent

Tanaka et al.

Patent Number: 5,946,147
Date of Patent: Aug. 31, 1999

[54] ROOF PRISM

[75] Inventors: Katsuto Tanaka, Kawachinagano; Ichiro Kasai, Sakai, both of Japan

[73] Assignee: Minolta Co., Ltd., Osaka, Japan

[21] Appl. No.: 08/517,353

[22] Filed: Aug. 21, 1995

Related U.S. Application Data

[63] Continuation of application No. 08/252,652, Jun. 1, 1994, abandoned.

[30] Foreign Application Priority Data

Jun. 4, 1993 [JP] Japan .................................. H5-134378

[51] Int. Cl.[6] .............................. G02B 5/04; B29D 11/00; B29C 45/00
[52] U.S. Cl. ........................... 359/831; 359/834; 359/836; 359/900; 264/2.5; 264/299; 264/328.1; 425/542
[58] Field of Search ..................... 359/831–836, 359/529, 530, 546, 900; 264/1.1, 1.7, 1.9, 299, 328.1, 2.5; 425/542

[56] References Cited

U.S. PATENT DOCUMENTS

| | | | |
|---|---|---|---|
| 1,285,775 | 11/1918 | Mihalyi | 359/835 |
| 2,399,909 | 5/1946 | Boughton et al. | 359/835 |
| 2,420,606 | 5/1947 | McLeod et al. | 359/831 |
| 2,911,682 | 11/1959 | Ewald | 359/831 |
| 3,421,407 | 1/1969 | Hiruma | 396/384 |
| 3,879,105 | 4/1975 | Broche et al. | 359/831 |
| 4,206,991 | 6/1980 | Kobori et al. | 359/836 |
| 4,278,339 | 7/1981 | Uchida et al. | |
| 4,309,078 | 1/1982 | Hara et al. | 359/836 |
| 4,381,884 | 5/1983 | Houle | 359/831 |
| 4,697,882 | 10/1987 | Sato et al. | |
| 5,056,892 | 10/1991 | Cobb, Jr. | 359/546 |
| 5,072,313 | 12/1991 | Schweitzer et al. | 359/836 |
| 5,130,855 | 7/1992 | Mukai et al. | 359/836 |
| 5,173,958 | 12/1992 | Folsom et al. | 359/835 |
| 5,331,395 | 7/1994 | Piske et al. | 359/834 |

FOREIGN PATENT DOCUMENTS

| | | | |
|---|---|---|---|
| 0174902 | 10/1983 | Japan | 359/836 |
| 2093210 | 8/1982 | United Kingdom | 359/836 |

*Primary Examiner*—Ricky D. Shafer
*Attorney, Agent, or Firm*—Burns, Doane, Swecker & Mathis, LLP

[57] ABSTRACT

An injection-molded roof prism has a roof surface. A positioning portion is provided for a positioning in a direction vertical to both a ridgeline formed at the roof surface and an optical axis bent at the ridgeline. The positioning portion is formed together with the ridgeline by using the same molding plate.

8 Claims, 11 Drawing Sheets

ROOF PRISM

This application is a continuation of application Ser. No. 08/252,652, filed Jun. 1, 1994, now abandoned.

BACKGROUND OF THE INVENTION

1. Field of the Invention

The present invention relates to a roof prism, and more specifically, to an injection-molded roof prism.

2. Description of the Prior Art

Referring to FIG. 1, there is shown a real image finder of the non-TTL (through the taking lens) type where a roof prism is used. This finder includes from the object side, an objective lens 1, a roof prism 2, a field frame 3, a penta prism 4 and an eyepiece 5. AX is a finder optical axis. Referring to FIG. 2, there is shown the finder of FIG. 1 viewed from the side of the field frame 3 along the X axis. The X, Y and Z axes are coordinate axes perpendicular to one another. As understood from FIGS. 1 and 2, a light beam on the optical axis AX is reflected at a ridgeline 2L.

The roof prism 2 shown in FIGS. 1 and 2 is made by injection molding, using a molding plate m$a$ and a molding plate m$b$ shown in FIGS. 3 and 4. FIG. 3 shows cross sections of the molding plates m$a$ and m$b$ taken on the XY plane along the ridgeline 2L of the roof prism 2 of FIGS. 1 and 2. FIG. 4 shows cross sections of the molding plates m$a$ and m$b$ taken on lines C1—C1 and C2—C2 of FIG. 3. In FIGS. 3 and 4, the roof prism 2 taken out of recesses V$a$ and V$b$ of the plates m$a$ and m$b$ is shown so as to be viewed from the side along the boundary between a roof portion 2D and a side portion 2S (i.e. from the side of the cross sections of the molding plates m$a$ and m$b$).

The injection molding of the roof prism 2 is performed in the following manner. First, the molding plates m$a$ and m$b$ are attached closely. Then, molten resin is injected through apertures (not shown) formed in the plates m$a$ and m$b$ into a cavity formed inside the plates m$a$ and m$b$ by the recesses V$a$ and V$b$. After the resin is cooled, the molding plates m$a$ and m$b$ are opened to take out the roof prism 2. The side portion 2S of the roof prism 2 is formed by the molding plate m$a$, while the roof portion 2D of the roof prism 2 is formed by the molding plate m$b$.

The roof prism 2 made in the above-described manner is attached to an attachment member 7 as shown in FIG. 5. The roof prism 2 is attached to the attachment member 7 in the following manner. Three pins 9 are provided to stand inside the attachment member 7. The roof prism 2 is inserted into the attachment member 7 so that one side (this surface is used as a reference for positioning along the Z axis) of the side portion 2S abuts the pins 9. Then, set springs 8$x$ and 8$y$ provided for positioning are attached to push the roof prism 2 along the X and Y axes. The side portion 2S of the roof prism 2 is pressed against reference attachment surfaces S$x$ and S$y$ for positioning along the X and Y axes.

With respect to the direction along the Z axis (i.e. the direction normal to both the ridgeline 2L of the roof prism 2 and the optical axis AX), the tips of the three pins 9 are used as the reference position along the Z axis, which is substituted for the reference attachment surface. The pins 9 are used so that the surfaces of the side portion 2S can easily be set at desired positions when the roof prism 2 is used with the side portion 2S being inclined. First, a set spring (not shown) is attached to a surface opposite to the surface of the side portion 2S which is in contact with the pins 9 while the side portion 2S is pressed against the tips of the pins 9. Then, by putting the lid (not shown) on so that the roof prism 2 is pushed along the Z axis, the positioning along the Z axis is completed. As described above, the side portion 2S of the roof prism 2 is conventionally used as a positioning portion for positioning along the Z axis.

In the injection molding of the roof prism, the injection of the resin and the taking out of the part are performed after two (sometimes more than two) molding plates are opened and closed as described above. However, since the position relationship between the molding plates are decided by a member such as a guide, the positions of the molding plates deviate from each other to some extent every time the molding plates m$a$ and m$b$ are opened and closed. This is caused, for example, by a backlash of a guide (not shown) used to open and close the molding plates m$a$ and m$b$, and causes a deviation of positions of the molding plates m$a$ and m$b$ in the direction of arrow m$z$ (FIG. 4).

Referring to FIG. 6, there is shown a roof prism 2 formed under a condition where the molding plates m$a$ and m$b$ are deviated from each other. In this roof prism 2, as shown in the figure, the roof portion 2D is deviated along the Z axis with respect to the side portion 2S serving as the positioning portion. Therefore, when this roof prism 2 is attached to the attachment member 7 as shown in FIG. 5, this deviation results in a position deviation of the ridgeline 2L along the Z axis with respect to the finder optical axis AX.

Referring to FIG. 7, there are shown the position of a finder optical axis AX1 when the ridgeline 2L is at the correct position, and the position of a finder optical axis AX2 when the ridgeline 2L is deviated from the correct position along the Z axis. When the finder optical axis AX1 is on the ridgeline 2L (i.e. when the finder optical axis AX1 is bent at the ridgeline 2L), the course of the finder optical axis AX1 is only bent at the ridgeline 2L at 90 degrees. However, when the ridgeline 2L of the roof portion 2D is deviated along the Z axis, the finder optical axis AX2 is deviated along the Z axis (toward the opposite side over the finder optical axis AX1) by an amount twice the deviation amount A of the ridgeline 2L at a roof surface 2$d$ as well as its course is bent at 90 degrees. This means that the direction of observation through the finder changes.

Referring to FIG. 8, the broken lines show a condition where the roof prism is deviated along the Z axis under the condition of FIG. 2. In this case, the direction in which the finder faces is varied with respect to the finder optical axis AX as shown by the chain double-dashed lines. Since an index error is caused if the direction in which the finder faces varies as shown in FIG. 8, the area viewed through the finder differs from the area printed onto the film as shown in FIG. 9. As a result, it may occur that the face is not photographed although photographing of the whole body is intended. In FIG. 9, the solid line shows a photographic area, the broken line shows a finder field when the ridgeline 2L is at the correct position, and the chain double-dashed line shows a finder field when the ridgeline 2L is deviated from the finder optical axis AX, for example, due to a mis-attachment of the roof portion 2D.

FIGS. 7 to 9 show a case where the ridgeline 2L is deviated with respect to the finder optical axis AX due to the deviation of attachment position of the roof prism 2. This case is optically equivalent to a case where the roof prism 2 shown in FIG. 6 is attached to the attachment portion 7 (FIG. 5). Thus, if the ridgeline 2L is deviated with respect to the positioning portion, it is impossible to accurately decide the position of the ridgeline 2L with respect to the finder optical axis AX.

SUMMARY OF THE INVENTION

An object of the present invention is to provide a roof prism where the position of the ridgeline relative to the optical axis can be decided accurately.

To achieve the above-mentioned object, in a roof prism of the present invention which is injection-molded and has a roof surface, a positioning portion for a positioning in a direction normal to both a ridgeline formed at the roof surface and an optical axis bent at the ridgeline is formed together with the ridgeline by using a same molding plate.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the drawings. The same elements and portions as those of the conventional prism of FIGS. 1 to 9 are identified by the same reference designations, and detailed description thereof will not be given.

Figure 10:
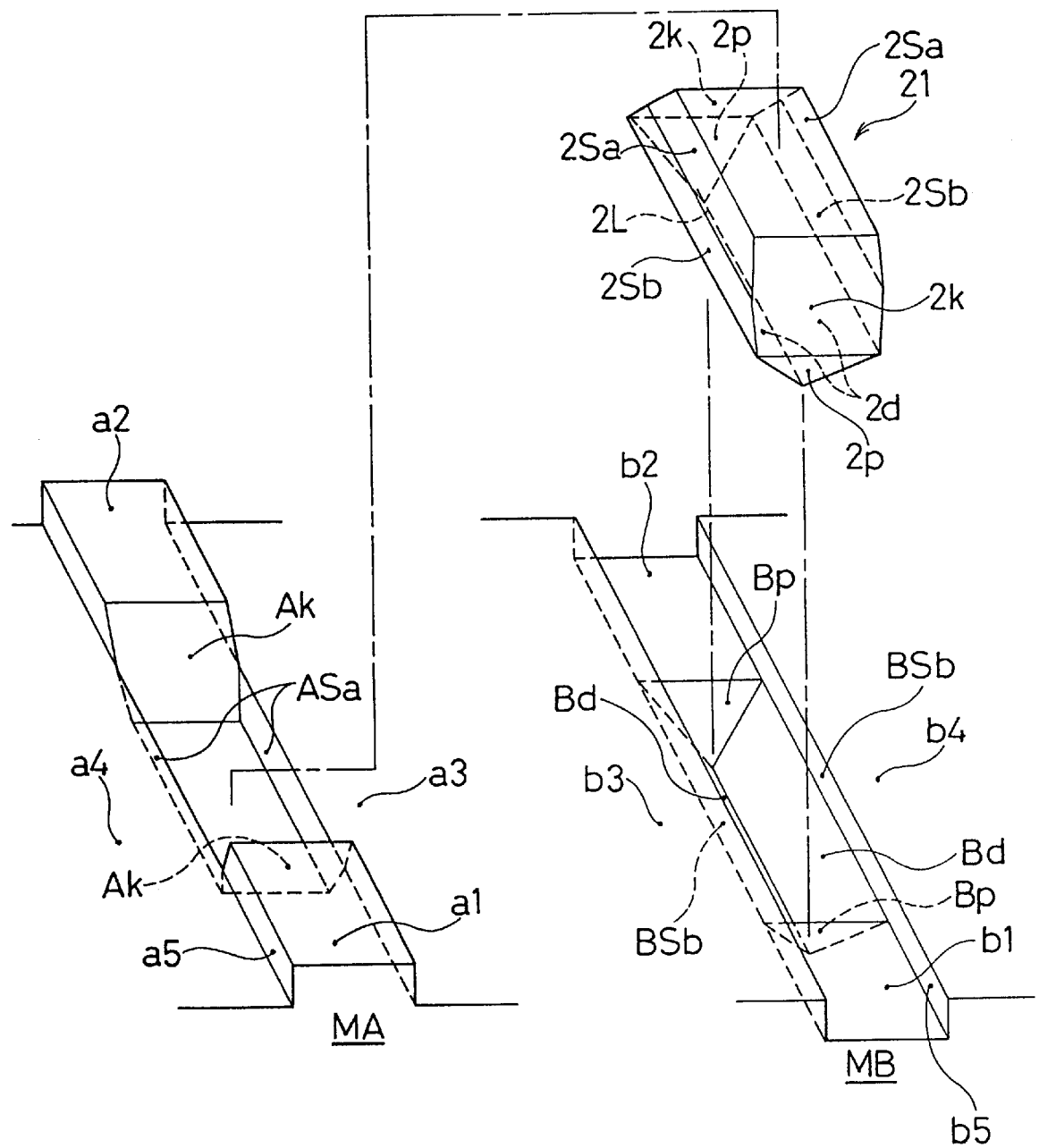
FIG. 10 is a perspective view showing a first embodiment of the present invention and molding plates used for making it.

First, a first embodiment of the present invention will be described. FIG. 10 shows molding plates MA and MB, and a roof prism 21 molded thereby. The alternate long and short dash line shows corresponding positions of the molding plates MA and MB and the roof prism 21.

Figure 11:
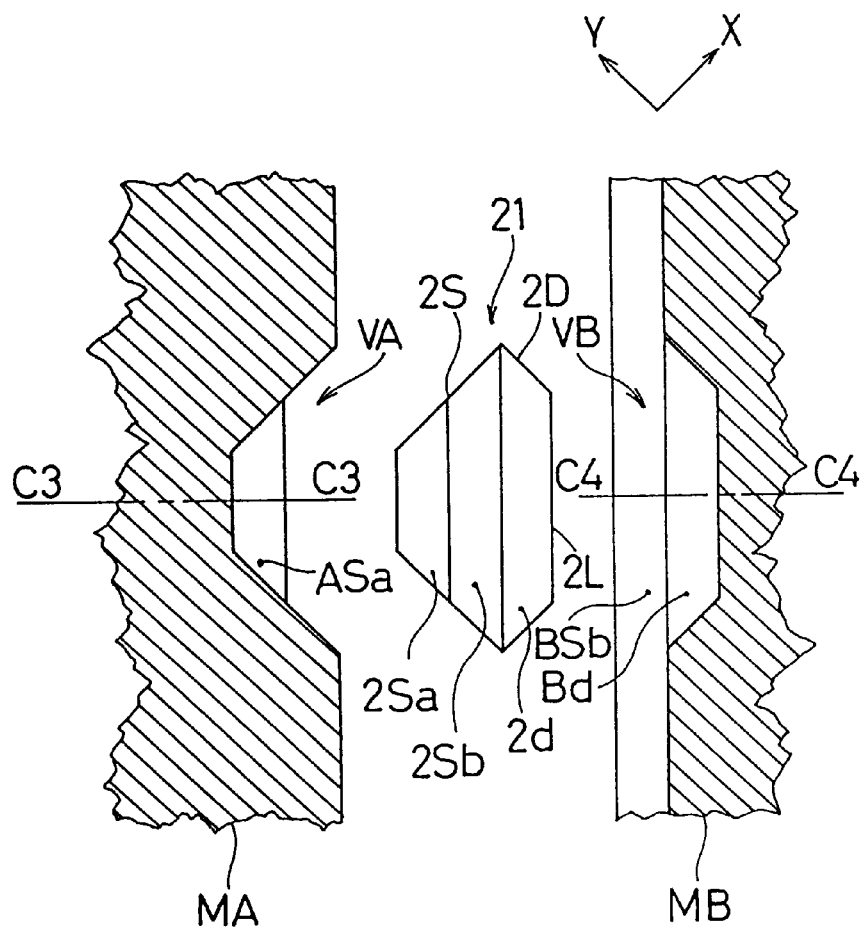
FIG. 11 shows a side view of the first embodiment of the present invention and cross-sectional view of the molding plates.
Figure 12:
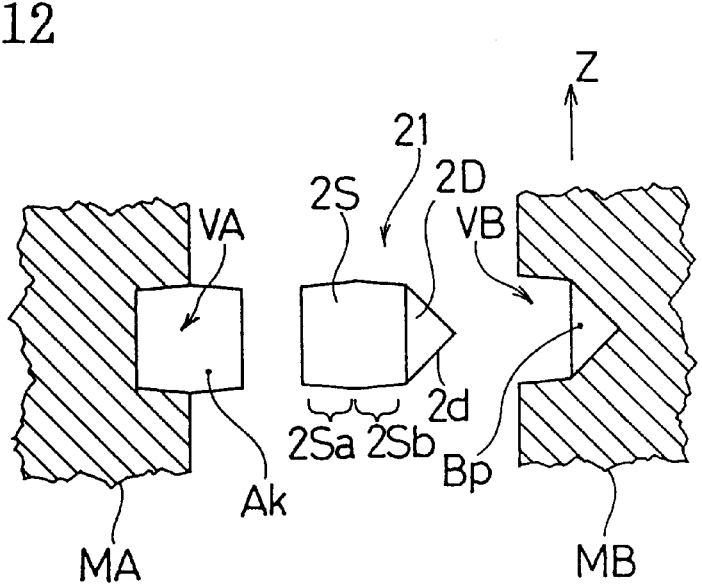
FIG. 12 shows a side view of the first embodiment of the present invention and cross-sectional views of the molding plates taken on lines C3—C3 and C4—C4.

FIG. 11 shows cross sections of the molding plates MA and MB taken on the XY plane along the ridgeline 2L of the roof prism 21. FIG. 12 shows cross sections of the molding plates MA and MB taken on lines C3—C3 and C4—C4. In FIGS. 11 and 12, the roof prism 21 taken out of recesses VA and VB of the plates MA and MB is shown so as to be viewed from the side along the boundary between the roof portion 2D and the side portion 2S (i.e. from the side of the cross sections of the molding plates MA and MB).

The roof prism 21 according to this embodiment is made by injection molding using the molding plates MA and MB shown in FIGS. 10 to 12 in the following manner. First, surfaces a1, a2, a3, a4 and a5 of the plate MA shown in FIG. 10 are closely attached to surfaces b1, b2, b3, b4 and b5 of the molding plate MB, respectively. Then, molten resin is injected through predetermined apertures (not shown) formed in the plates MA and MB into a cavity formed inside the plates MA and MB by the recesses VA and VB.

After the resin is cooled, the molding plates MA and MB are opened to take out the roof prism 21. The side portion 2S of the roof prism 21 is formed by the molding plates MA and MB, while the roof portion 2D of the roof prism 21 is formed by the molding plate MB. Incident and exit surfaces 2k are formed by a surface Ak of the molding plate MA, and a surface 2p pushed by the set springs 8y and 8k is formed by a surface Bp of the molding plate MB. The side surfaces of the side portion 2S are bent at the boundary between side surfaces 2Sa and 2Sb in order to prevent the generation of ghosts due to the total reflection at the side surfaces. When there is no possibility of the generation of ghosts, the side surfaces 2Sa and 2Sb may be one plane surface like the conventional roof prism.

Figure 1:
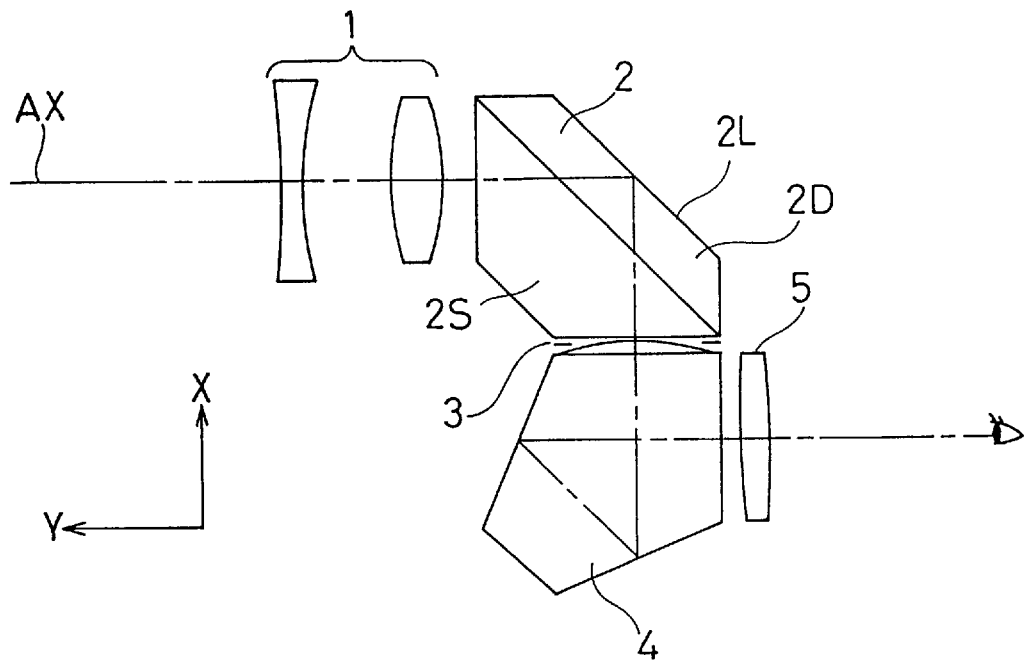
FIG. 1 cross-sectionally shows the structure of a real image finder of non-TTL type.
Figure 2:
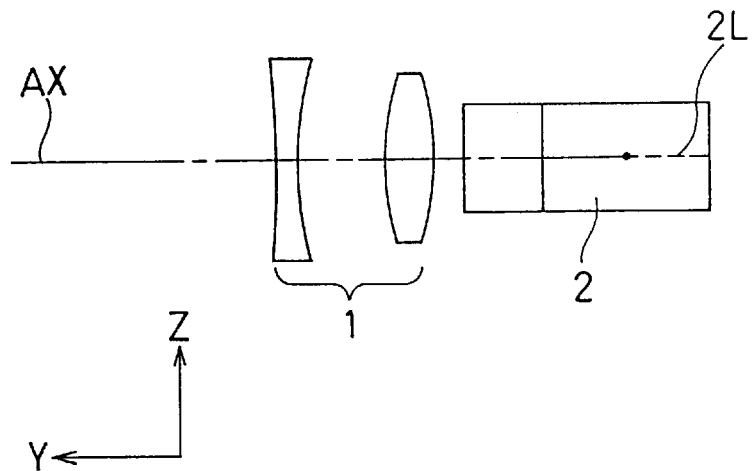
FIG. 2 shows a correctly arranged roof prism viewed from the side of a field frame of FIG. 1 along the X axis.
Figure 3:
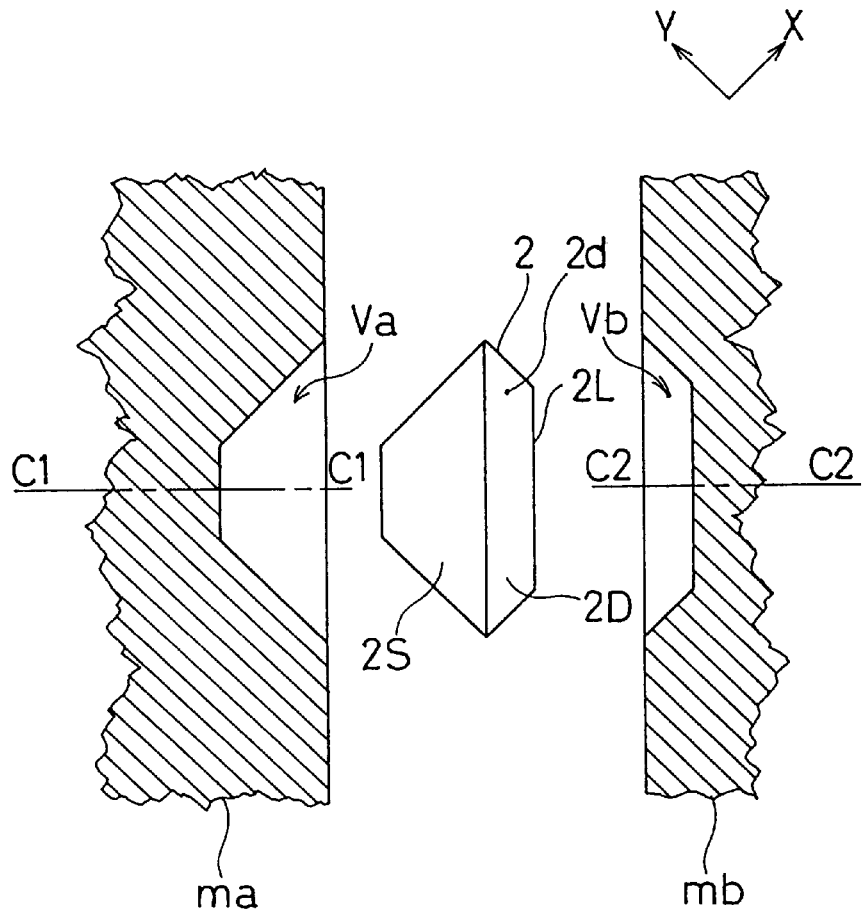
FIG. 3 shows a side view of a conventional roof prism and cross-sectional views of molding plates used for making the roof prism.
Figure 4:
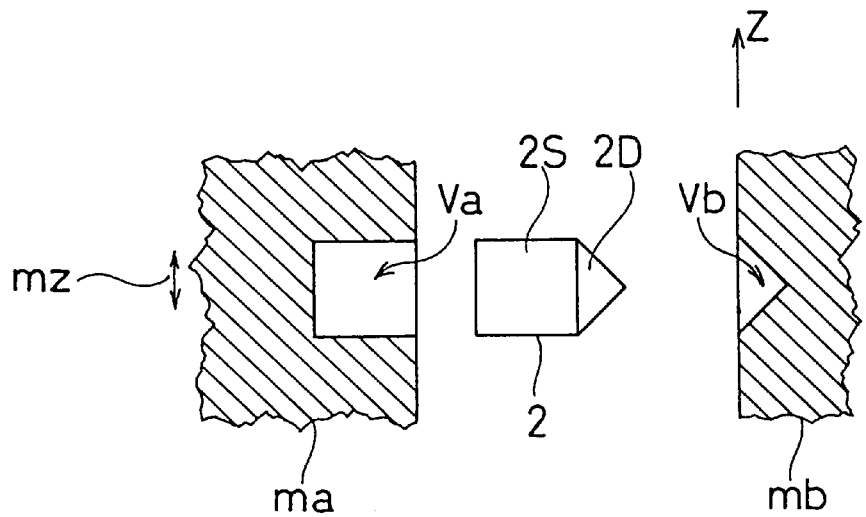
FIG. 4 shows a side view of the conventional roof prism and cross-sectional views of the molding plates taken on lines C1—C1 and C2—C2.
Figure 5:
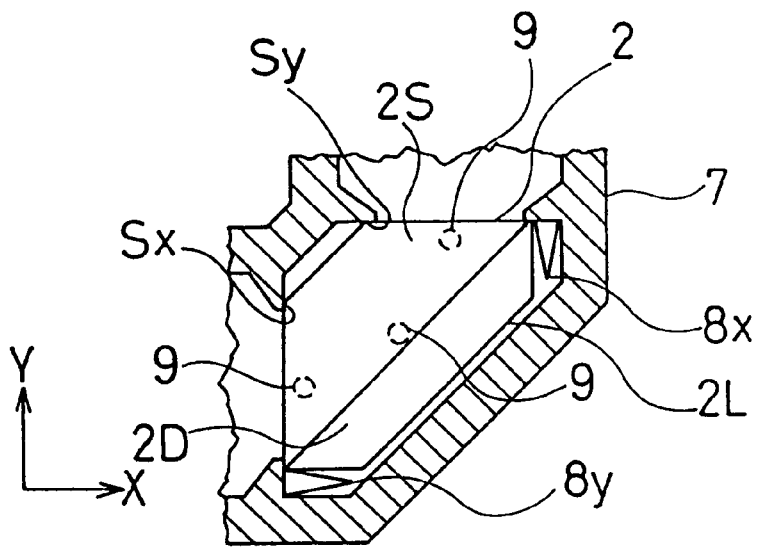
FIG. 5 cross-sectionally shows an attachment structure of the conventional roof prism.
Figure 6:
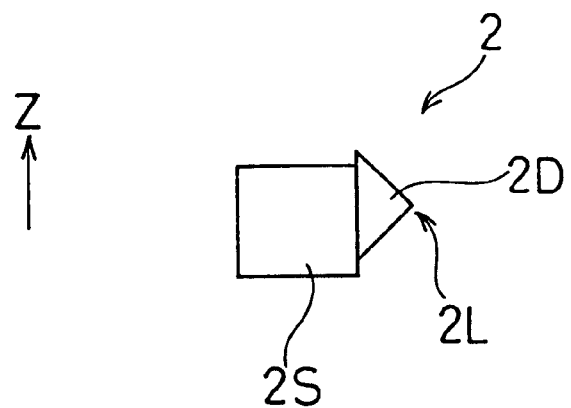
FIG. 6 shows a conventional roof prism formed by deviated molding plates viewed along the boundary between a roof portion and a side portion.
Figure 7:
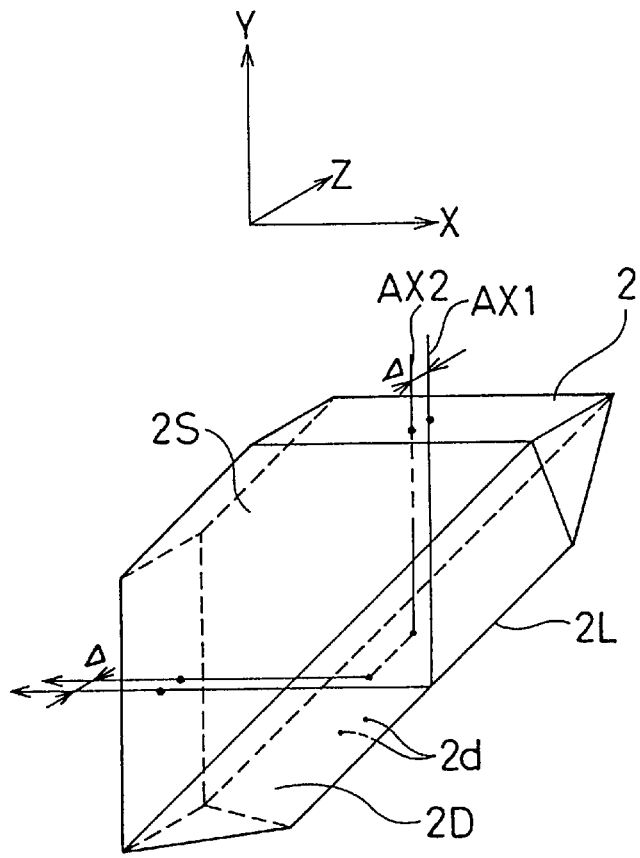
FIG. 7 is a perspective view of a roof prism where the deviation of the optical axis when the roof prism is deviated along the Z axis is shown.
Figure 8:
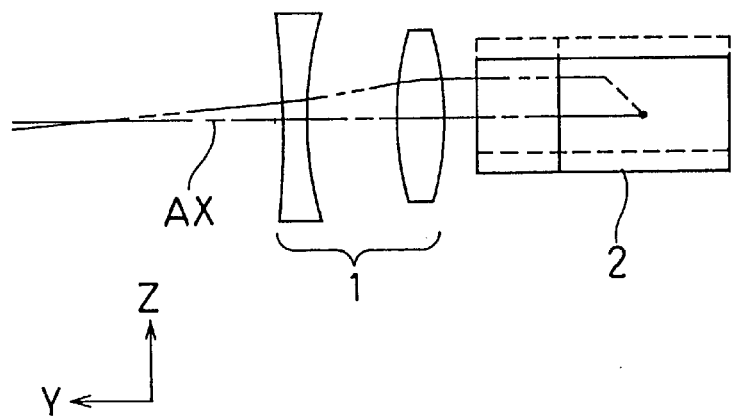
FIG. 8 shows a roof prism deviated from the correct position along the Z axis, viewed from the side of the field frame of FIG. 1 along the X axis.
Figure 9:
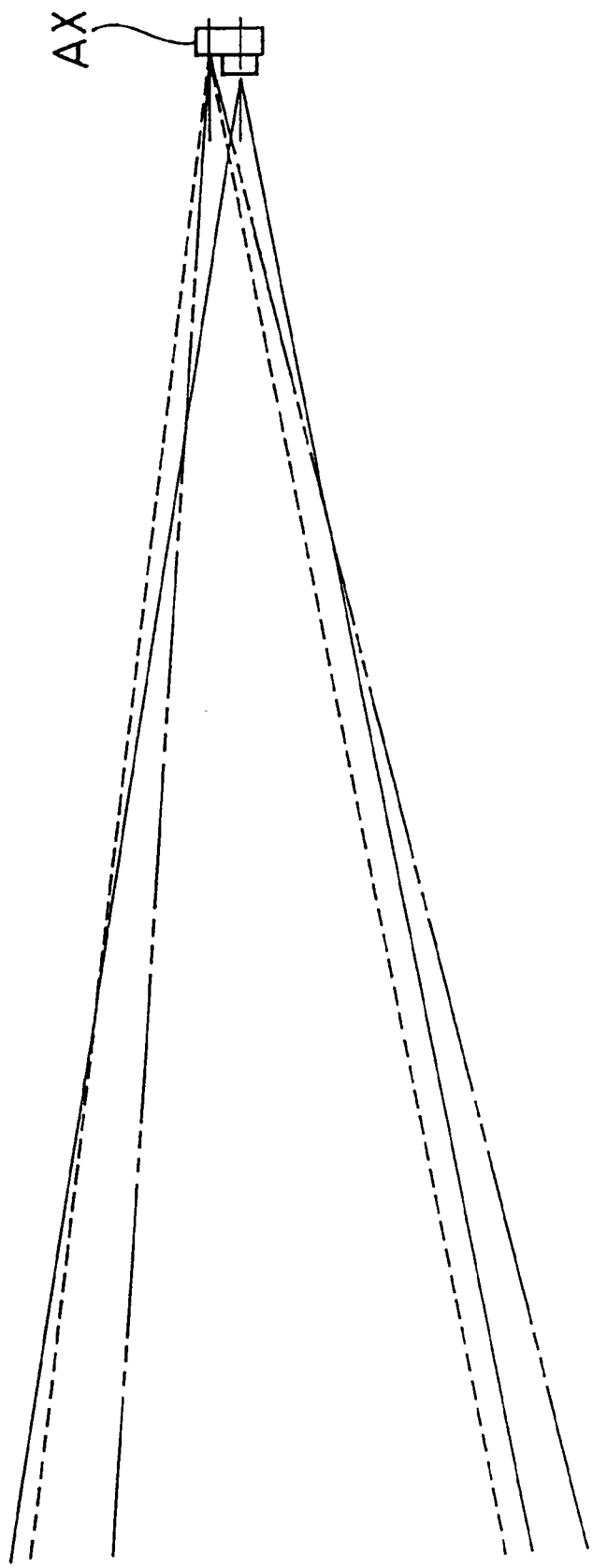
FIG. 9 shows the difference in finder field between when the roof prism is at the correct position and when the roof prism is deviated along the Z axis.
Figure 13:
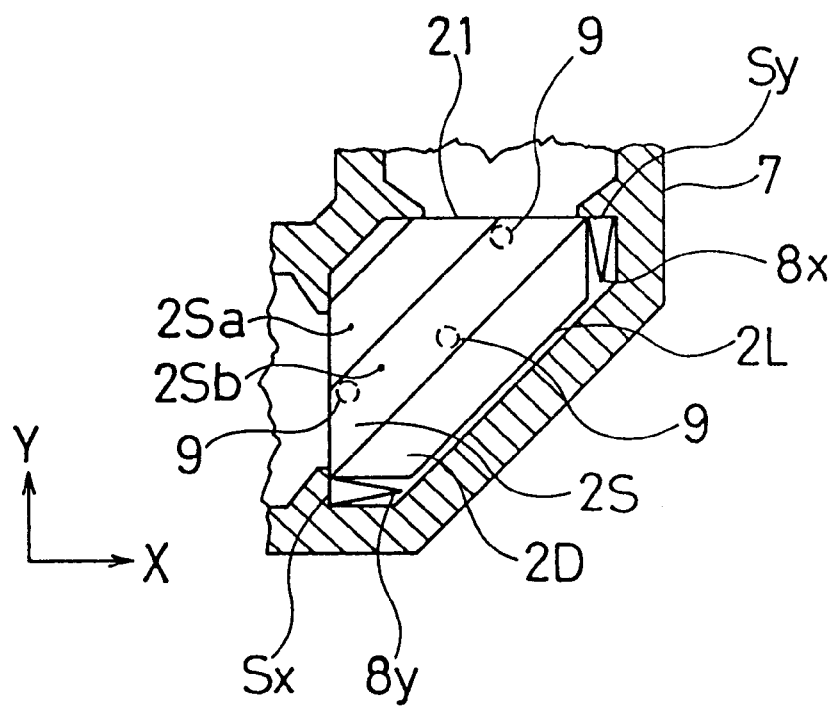
FIG. 13 cross-sectionally shows an attachment structure of the first embodiment of the present invention.

The roof prism 21 made in the above-described manner is attached to the attachment member 7 as shown in FIG. 13. The roof prism 21 is attached to the attachment member 7 in a similar manner to the conventional roof prism (FIG. 5). However, the side surface 2Sb formed together with the ridgeline 2L by the plate MB is made to abut the pins 9 for positioning along the Z axis.

For the same reason as the conventional roof prism, the side portion 2S of the roof prism 21 is used as the positioning portion (i.e. reference attachment surface along the Z axis) for the positioning along the Z axis (i.e. direction normal to both the ridgeline 2L formed at the roof surface 2d and the finder optical axis AX bent at the ridgeline 2L). However, this embodiment is characterized in that the side surface 2Sb is used as the positioning portion for the positioning along the Z axis and that the side surface 2Sb is formed together with the ridgeline 2L by the same molding plate MB.

In the conventional roof prism 2 (FIG. 5, etc.), since the roof portion 2D and the side portion 2S are formed by different molding plates (ma and mb, respectively) as described previously, the position relationship between the ridgeline 2L and the reference attachment surface (surface where the side portion 2S abuts the pins 9) changes when the molding plates ma and mb deviate from each other. On the contrary, according to this embodiment, the boundary between the portions formed by the molding plates MA and MB is at the middle of the side surface 2S so that the roof portion 2D and the half of the side portion 2S are formed by the molding plate MB, and the half, i.e. the side surface 2Sb of the side portion 2S is used as the reference attachment surface. Since the side surface 2Sb serving as the positioning portion and the ridgeline 2L are formed by the same molding plate MB, the ridgeline 2L does not deviate with respect to the side surface 2Sb even if the positions of the molding plates MA and MB deviate from each other. Therefore, by an accurate positioning with the side surface 2Sb, the ridgeline 2L is accurately positioned with respect to the finder optical axis AX without the problem as described above due to the opening and closing of the molding plates MA and MB.

In FIGS. 10 to 12, the molding plates MA and MB are each drawn as one body. However, molding plates divided at a position such as a ridgeline (e.g. the ridgeline 2L of the roof portion 2D) are generally used for the injection molding of roof prisms. This is because if there is a surface such as the surface Bp adjoining the surface 2d, it is technically difficult to grind the surface Bd for forming the roof surface 2d and to remove the dirt adhering to the surface Bd each time the molding is performed.

However, in assembling the divided molding plates, the positions of the molding plates MA and MB may deviate from each other. To prevent such a problem, it is preferable to use a female molding core formed by electroforming in this embodiment. This is because by forming the side surface 2Sb and the ridgeline 2L with the same molding core formed by electroforming, the ridgeline 2L is formed with high accuracy without any need to divide the molding plates.

Figure 14:
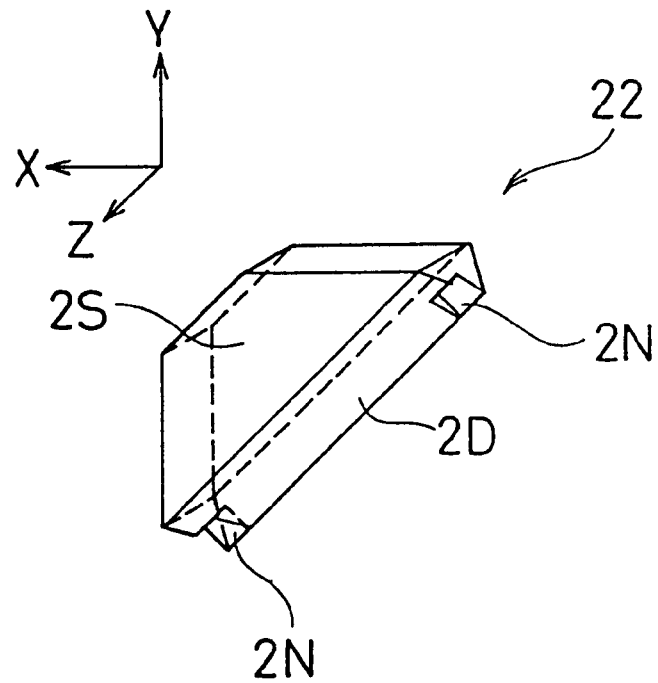
FIG. 14 is a perspective view of a second embodiment of the present invention.

Referring to FIG. 14, there is shown a perspective view of a second embodiment of the present invention. A roof prism 22 according to this embodiment is characterized in that a cut 2N is provided at each end of the roof portion 2D for positioning along the Z axis. For the positioning along the Z axis, the surface forming the cut 2N is pressed against the pins 9 like in the first embodiment. Since the positioning portion (the cut 2N in this embodiment) is close to the ridgeline 2L compared to the first embodiment, the ridgeline 2L is positioned more accurately.

Figure 15:
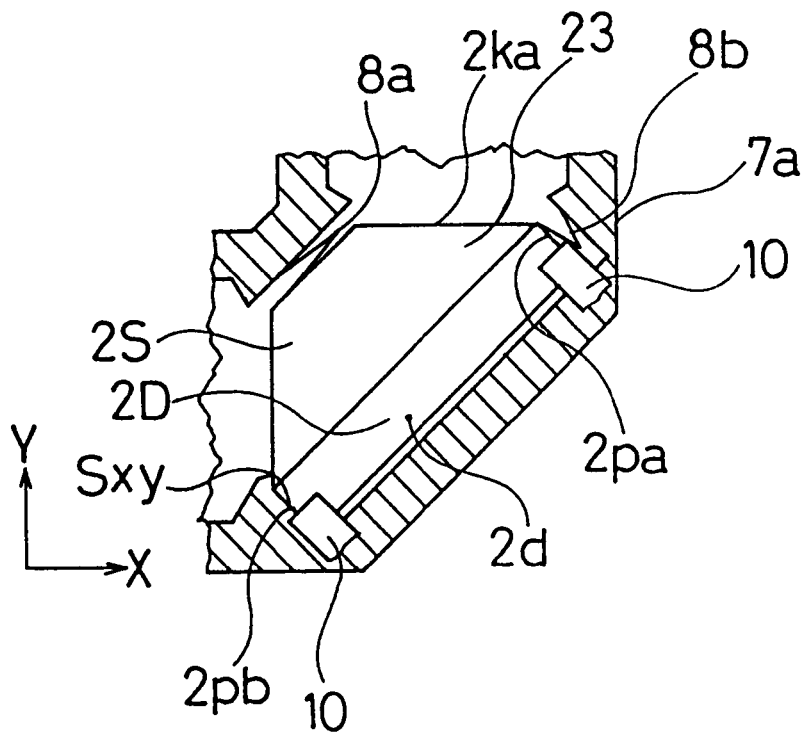
FIG. 15 cross-sectionally shows an attachment structure of a third embodiment of the present invention.
Figure 16:
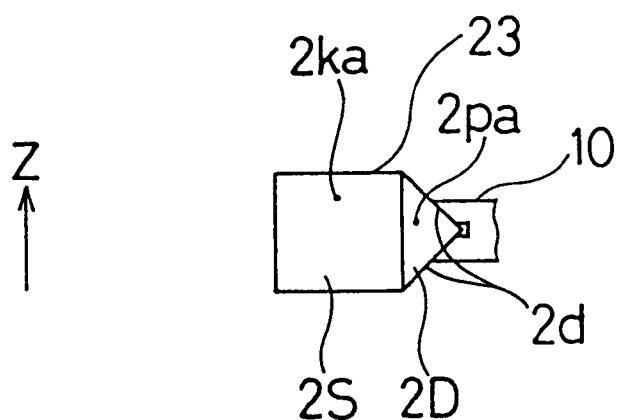
FIG. 16 is the attachment structure of the third embodiment of the present invention viewed from the side of an incident surface.

FIG. 15 shows a third embodiment of the present invention attached to an attachment member 7a. FIG. 16 shows the third embodiment of FIG. 15 viewed from the side of surfaces 2pa and 2ka. A roof prism 23 according to this embodiment is characterized in that the roof surface 2d is used as the positioning portion for the positioning along the Z axis. By pushing the roof prism 23 by a set spring 8a from the opposite side of supporting portions 10, the roof surface 2d of the roof portion 2D is pressed against the V-shaped surfaces of the supporting members 10, so that the position along the Z axis is decided. The positioning is performed more accurately since the supporting members 10 replacing the pins 9 used in the first embodiment support the roof surface 2d at positions close to the ridgeline 2L.

The positioning along the X and Y axes is performed by pushing the surface 2pa by a set spring 8b to press a surface 2pb against a reference attachment surface Sxy for the positioning along the X and Y axes. Thus, the third embodiment is advantageous since only one reference attachment surface and one set spring are required for positioning along the X and Y axes.

Figure 17:
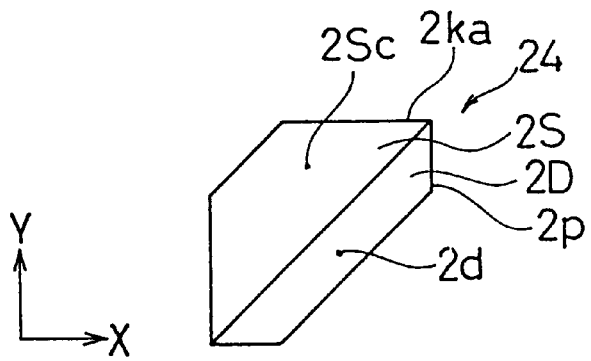
FIG. 17 is a front view of a fourth embodiment of the present invention.
Figure 18:
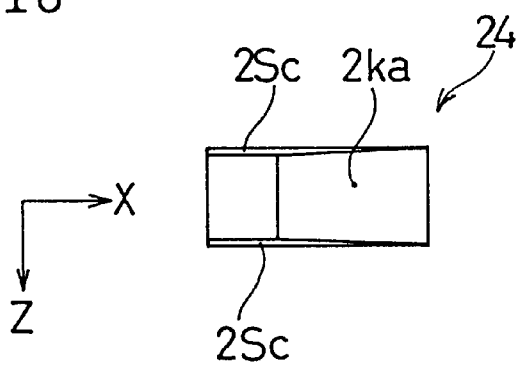
FIG. 18 is a plan view of the fourth embodiment of the present invention.
Figure 19:
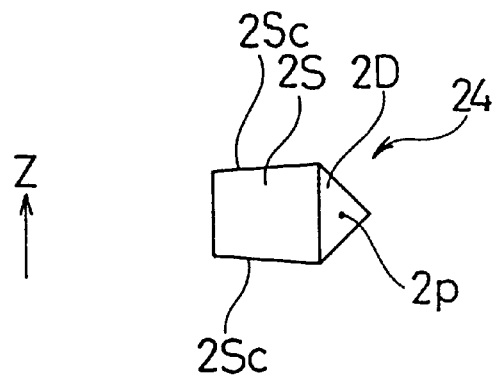
FIG. 19 is the fourth embodiment of the present invention viewed from the side of an incident surface.

FIGS. 17 and 18 are a front view and a plan view of a fourth embodiment of the present invention, respectively. FIG. 19 shows the fourth embodiment viewed from the side of an incident surface 2ka and a surface 2p. A roof prism 24 according to this embodiment is characterized in that a side surface 2Sc is inclined at 4 degrees relative to a surface perpendicular to the boundary between the side portion 2S and the roof portion 2D. The side surface 2Sc is inclined for the same reason why the side surfaces 2Sa and 2Sb are inclined in the first embodiment, i.e. in order to prevent the generation of ghosts due to the total reflection at the side surfaces.

Figure 20:
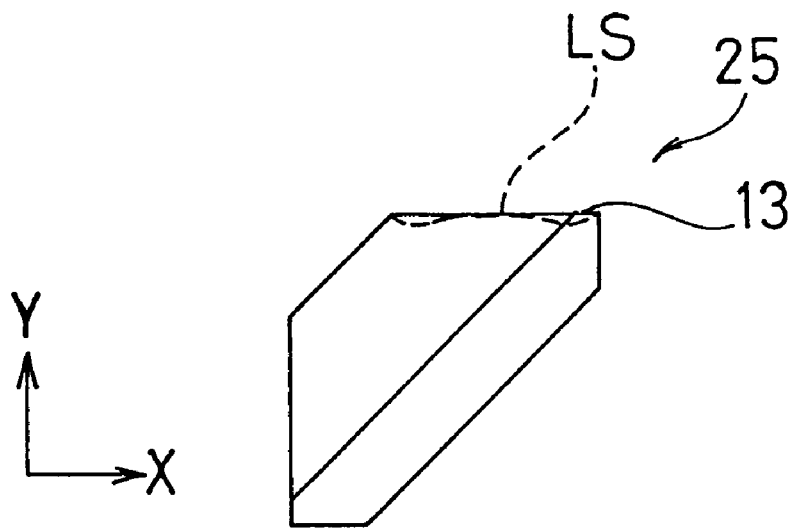
FIG. 20 is a front view of a fifth embodiment of the present invention.
Figure 21:
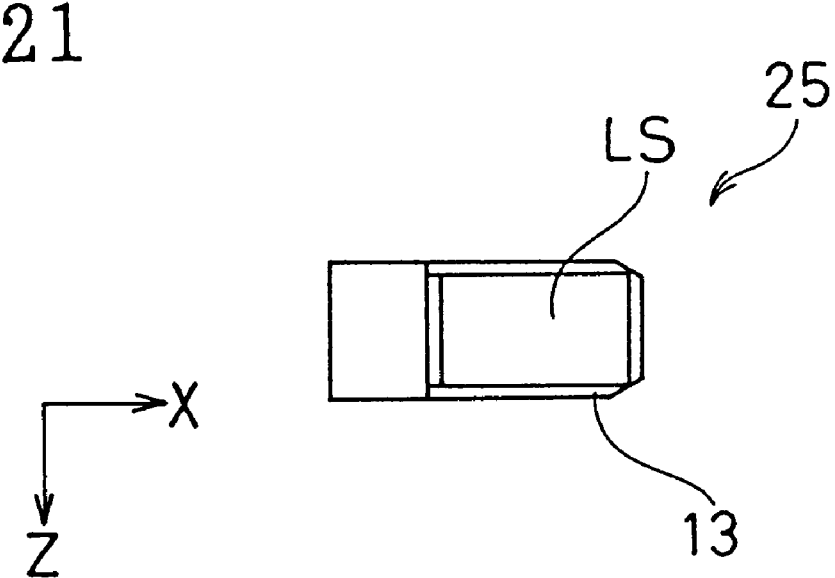
FIG. 21 is the fifth embodiment of the present invention viewed from the side of an incident surface.

FIGS. 20 and 21 are a front view and a plan view of a fifth embodiment of the present invention, respectively. A roof prism 25 according to this embodiment is characterized by having a spherical incident surface LS (convex lens form in this embodiment; however, it may be a concave lens form). Since spherical or aspherical incident and exit surfaces of the roof prism can substitute for another lens, the number of lens elements and the size of the system are reduced.

Moreover, as shown in FIGS. 20 and 21, the spherical incident surface LS is arranged a little further inside from an attachment surface 13 (corresponding to the surface in contact with the reference attachment surface Sy in FIG. 13), the surface LS is not readily flawed when inserted into the attachment member 7 as shown in FIG. 13.

As described above, according to the present invention, in an injection-molded roof prism having a roof surface, since a positioning portion for positioning in a direction normal to both a ridgeline formed at the roof surface and the optical axis bent at the ridgeline is formed together with the ridgeline by using the same molding plate, the position of the ridgeline relative to the positioning portion is accurate. As a result, the position of the ridgeline relative to the optical axis is accurately decided by performing positioning with respect to the positioning portion.

Further, by supporting the roof prism with the roof surface as the positioning portion, the position of the ridgeline can be decided accurately irrespective of the accuracy in dimensions of the roof prism.

Obviously, many modifications and variations of the present invention are possible in light of the above teachings. It is therefore to be understood that within the scope of the appended claims, the invention may be practiced other than as specifically described.

What is claimed is:

1. An injection-molded roof prism having a roof surface, a ridgeline formed at the roof surface at which an optical axis is bent, and a reference plane which is adjacent to the roof surface for positioning the prism in a direction normal to both said ridgeline and said optical axis, wherein said ridgeline and said reference plane are formed together by a single molding plate to thereby preserve a desired positional relationship between them.

2. A roof prism as claimed in claim 1, wherein said reference plane is a side surface adjoining said roof surface.

3. A roof prism as claimed in claim 1, wherein said reference plane is a cut formed in said roof surface.

4. A roof prism having a roof surface, wherein said roof prism includes at least one reference surface for positioning the prism in a direction normal to both a ridgeline formed at the roof surface and an optical axis that is bent at the ridgeline, and wherein said reference surface is formed in said roof surface.

5. The roof prism of claim 4, wherein said reference surface is formed by a recess in said roof surface.

6. The roof prism of claim 5, wherein said recess is located adjacent said ridgeline.

7. A roof prism having two reflective surfaces and two transmissive surfaces, comprising:

a roof portion which is constituted by said two reflective surfaces; and a side portion, which is constituted by two side surfaces, for supporting said two reflective surfaces and two transmissive surfaces; wherein each of said two side surfaces is inclined at an angle of 1 to 10 degrees relative to a surface including a ridgeline formed at the roof surface and a viewfinder optical axis.

8. In an injection-molding process for forming a roof prism of the type having a roof surface and a reference plane which is adjacent to the roof surface for positioning the prism in a direction normal to both a ridgeline formed at the roof surface and an optical axis that is bent at the ridgeline, the step of forming the reference plane and the ridgeline with a single molding plate to thereby preserve a desired positional relationship between them.

* * * * *